United States Patent [19]
Fearon

[11] Patent Number: 5,552,001
[45] Date of Patent: Sep. 3, 1996

[54] OXYGEN YIELDING FIRESTARTER/FIREBUILDER

[76] Inventor: Robert E. Fearon, Box 470787, Tulsa, Okla. 74147-0787

[21] Appl. No.: 285,693

[22] Filed: Aug. 4, 1994

[51] Int. Cl.$^6$ .............................................. C06B 29/02
[52] U.S. Cl. .................... 149/77; 149/35; 149/87
[58] Field of Search .................... 149/35, 77, 87

[56] References Cited

U.S. PATENT DOCUMENTS

| | | | |
|---|---|---|---|
| 58,567 | 10/1866 | Allen | 149/2 X |
| 1,882,365 | 10/1932 | Lubelsky | 149/2 X |
| 2,000,414 | 5/1935 | Neukirch | 52/16 |
| 2,217,994 | 10/1940 | Rick et al. | 44/16 |
| 2,876,084 | 3/1959 | Leggin | 44/16 |
| 2,953,443 | 9/1960 | Lloyd | 44/3 |
| 3,252,770 | 5/1966 | Fearon | 44/40 |
| 3,293,187 | 12/1966 | Markowitz | 252/186 |
| 3,515,525 | 6/1970 | Fearon | 44/38 |
| 3,741,585 | 6/1973 | Hendrickson et al. | 280/150 AB |
| 3,865,035 | 2/1975 | Munson et al. | 102/66 |
| 3,964,256 | 6/1976 | Plantif et al. | 60/219 |
| 4,041,217 | 8/1977 | Collins | 149/37 X |
| 4,053,337 | 10/1977 | Collins | 149/37 X |
| 4,508,580 | 4/1985 | Klober et al. | 149/19.91 |
| 4,522,665 | 6/1985 | Yates, Jr. et al. | 149/21 |
| 4,533,416 | 8/1985 | Poole | 149/35 |

OTHER PUBLICATIONS

Transactions Of The American Institute Of Mining And Metallurgical Engineers vol. LXXIII pp. 255 & 256 A. D. 1926.

The Chemistry Of Powder And Explosives– Tenney L. Davis, Ph. D. A. D. 1943 p. 45 et seq. (published by John Wiley and Sons, New York).

*Primary Examiner*—Peter A. Nelson

[57] ABSTRACT

The invention disclosed herein is an explicit procedure for initiating a charcoal fire and afterward building the fire, including a plan for effective support of the fire by air after the fire has been built. Arrangements to direct the afterward flow of air to the same charcoal briquets which are on fire at the end of the firebuilding process are featured. Directing and concentrating the hot oxygen to establish a concentration of the fire (a nest of coals) is featured. The container of the oxidizing agent serves two purposes, the support of the oxidizing agent during the firebuilding activity, and, initially by combustion of a portion of itself, the provision of a hot oxygen mixture to effectively initiate the fire before a firebuilding feedback process begins. A better way to achieve tabletted form of the chemically active ingredients has been discovered, comprizing the use of a composition of matter in which all the ingredients are active in supplying oxygen. A chemical improvement in the oxidizer which imparts a greater tendency for coals to persist once they have been established on the charcoal briquets is a feature. New and effective chemical compositions to better program the yielding of the firebuilding oxygen are shown in this specification.

2 Claims, 3 Drawing Sheets

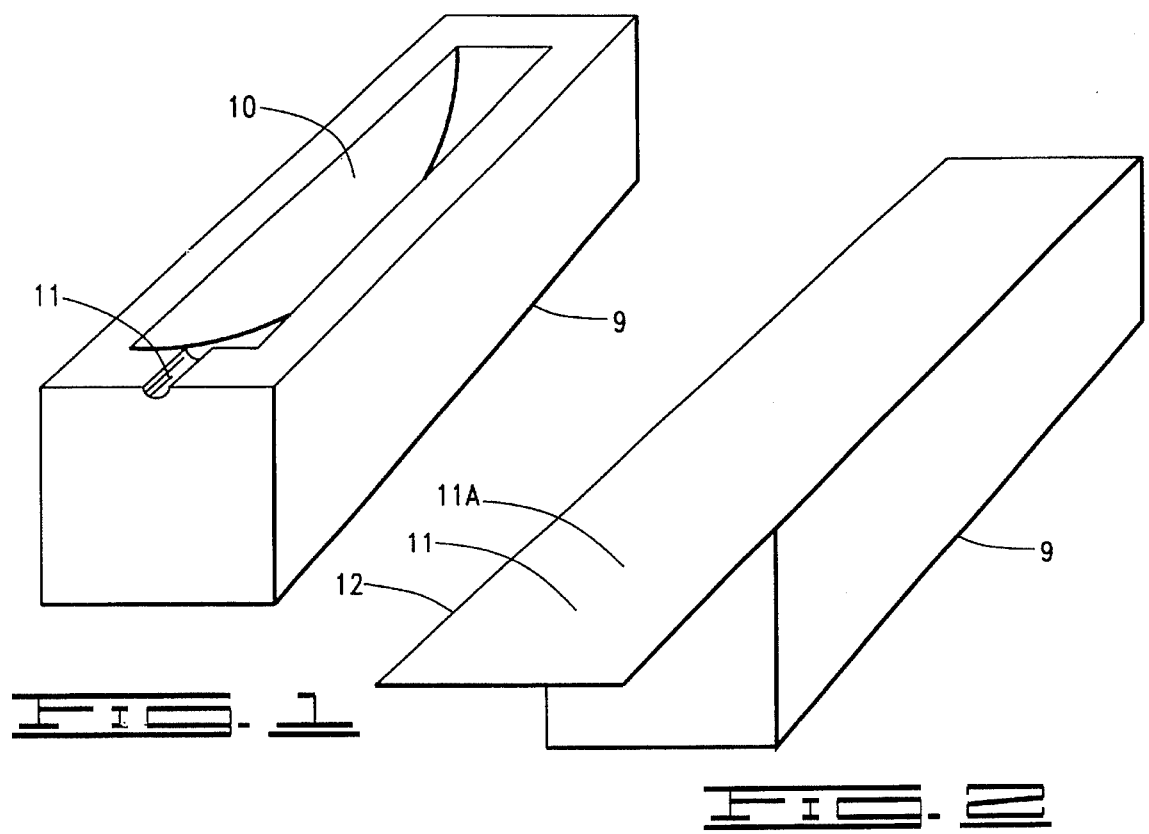
FIG. 1
FIG. 2
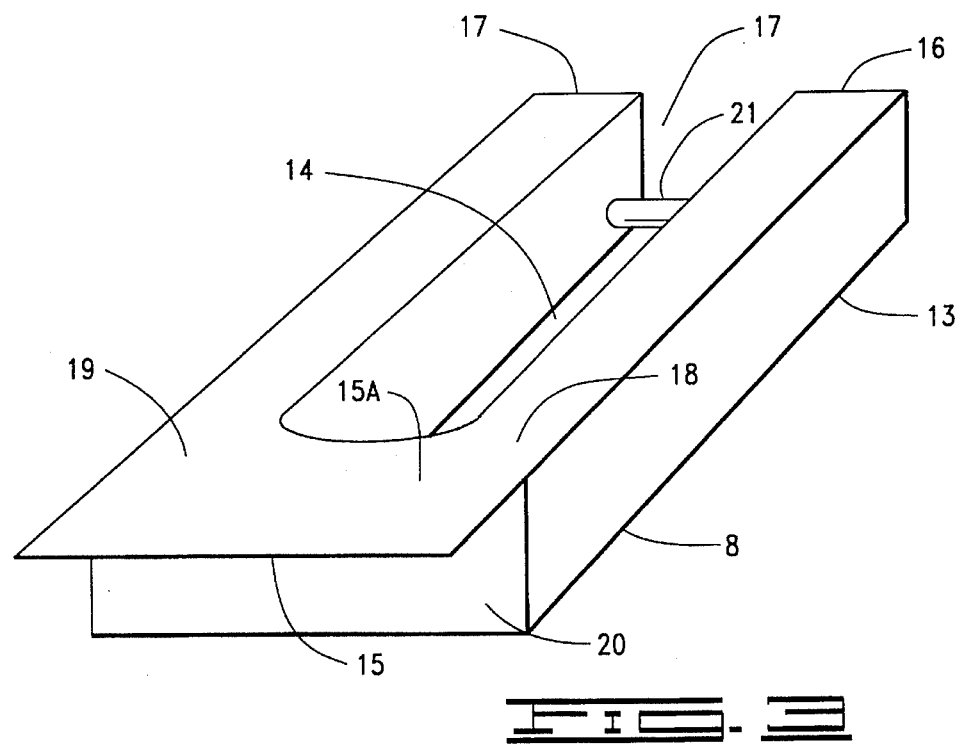
FIG. 3

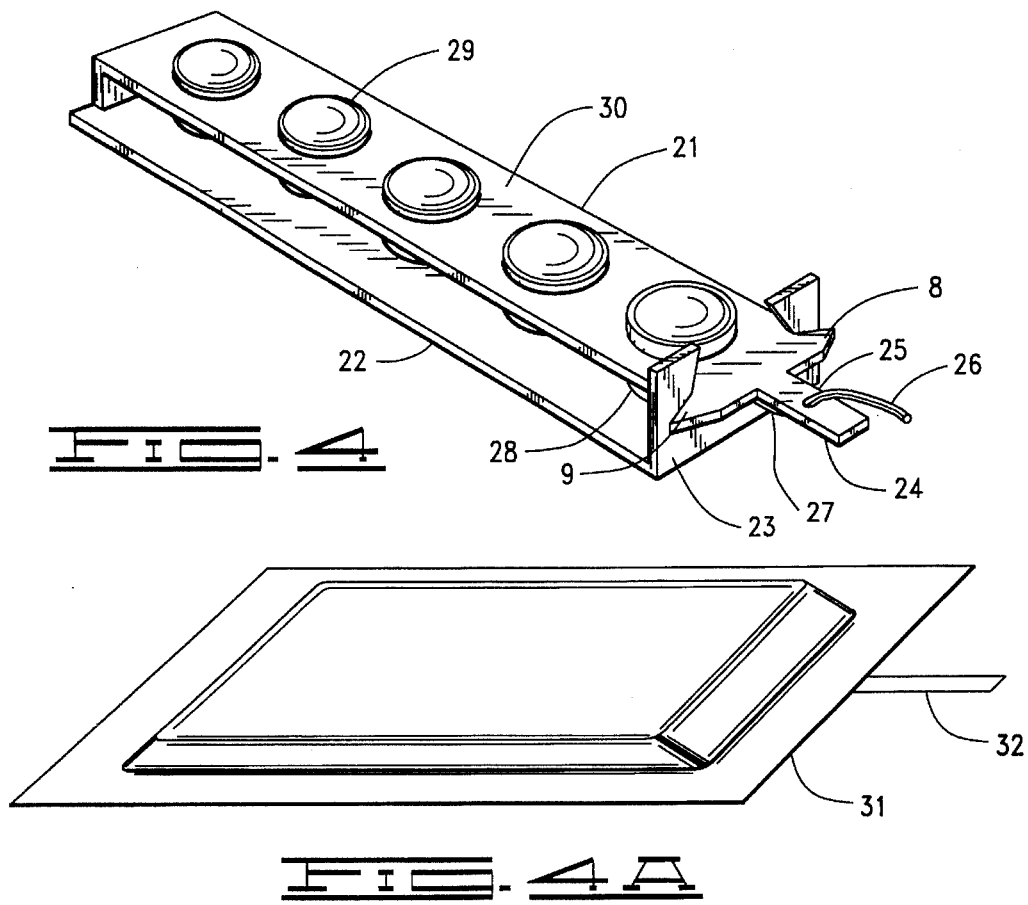
FIG. 4
FIG. 4A
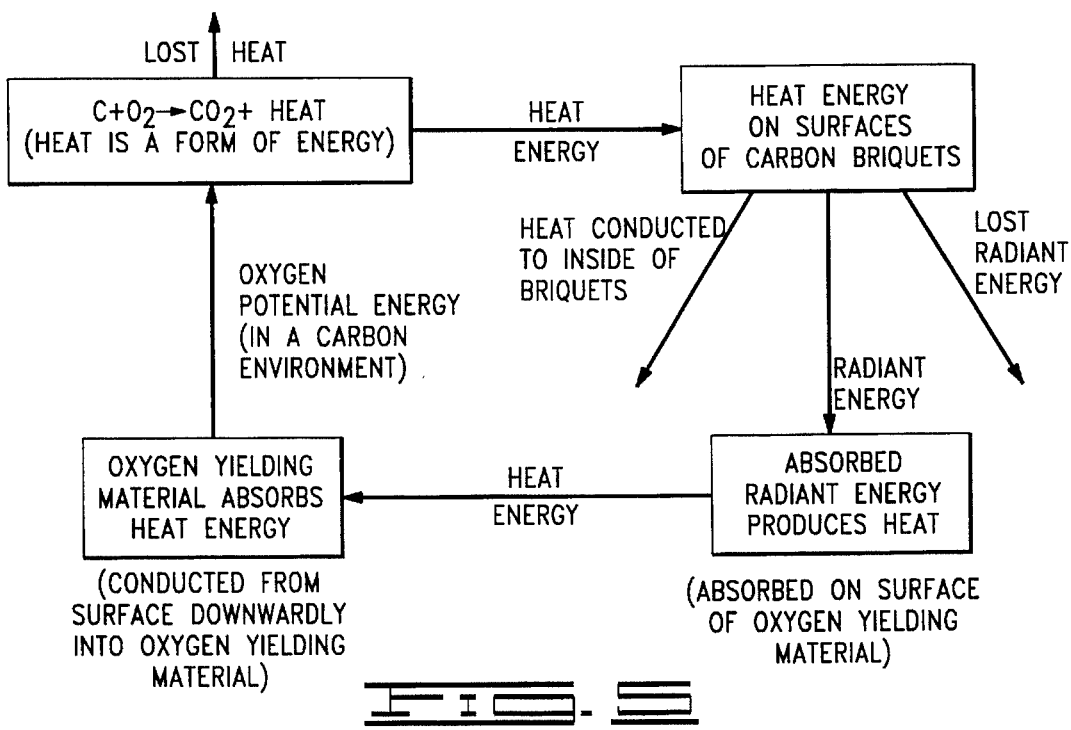
FIG. 5

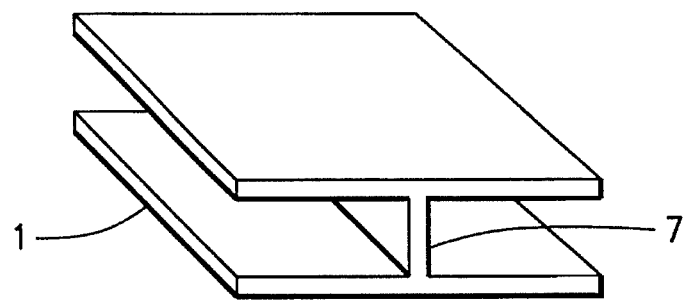
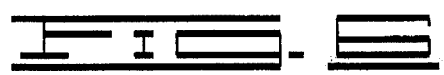
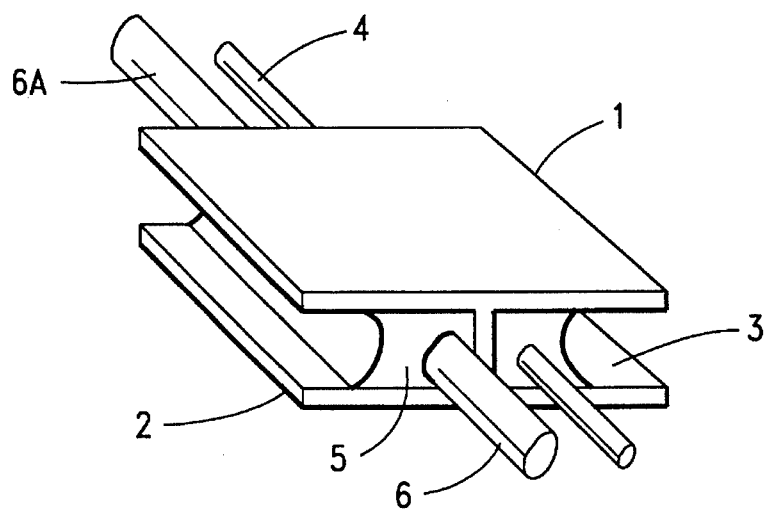
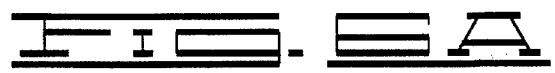
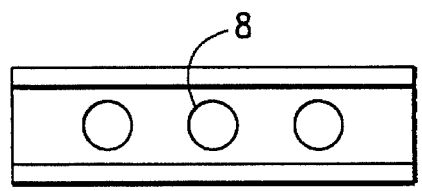
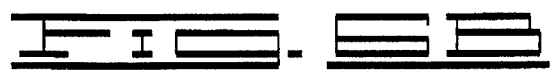

5,552,001

OXYGEN YIELDING FIRESTARTER/FIREBUILDER

BACKGROUND OF THE INVENTION

1. Field of the Invention

Method and means to promptly bring about a strongly burning nest of charcoal briquets in a very short time are set out herein. A very distinguishing feature of the present invention is comprized in the fact that the predominant process of this type of firemaking is the powerful, very rapid, and intensely hot combustion of the charcoal itself. Because the main feature of my firestarting is the burning of charcoal, or other solid carbonaceous fuel (including but not limited to wood, peat, coal, bakelite and other infusible combustible plastics), and because the combustion of auxiliary starting fuel is negligible by comparison to the activity of the charcoal or other carbonaceous fuel, the fiery beginning brought about by my new firestarter/firebuilder is largely within the fuel being lit, and dangerous flames and sparks do not emerge into the environment, as is the case with other firestarters and carbonaceous fuel lighting methods.

2. Description of the Prior Art

The prior art is well illustrated by a number of older U.S. Pat. Nos. such as: Allen, 58,567, October 1866; Lubelsky, 1,882,365, October 1932; Neukirch, 2,000,414, May 1933; Rick et al, 2,217,994, October 1940; Leggin, 2,876,084, March 1959; Lloyd, 3,953,443, September 1960; Fearon, 3,252,770; and Markowitz, 3,293,187. Also, there are a number of items currently in the market, many of which are unpatented. This portion of the art includes, among other things, charcoal briquets of altered manufacture which can be lit by a match or by a cigarette lighter directly, and then employed to ignite other charcoal briquets of the ordinary sort. Cardboard containers with an oxidizing agent in the spaces between the cellulose fiber can still be found, or, if desired, made up by an operator who soaks the container in a rich warm water solution of potassium nitrate and then dries it. Crumpled newspaper, sticks containing paraffin wax, and other sorts of readily ignited auxiliary fuels such as petroleum naphtha are generally available.

With the exception of my own U.S. Pat. No. 3,252,770 May 1966, all the workers of the prior art have failed to properly address the basic problem of firestarting. To make a fire there are three entities necessary, and all three must be present in the same space at the same time. These entities are: a fuel that can burn in air, heat applied to the fuel sufficient to raise its temperature above the ignition point, and availability of oxygen of the air in immediate contact with the heated fuel. If the total amount of fuel so ignited can add heat energy more rapidly than it loses the heat energy, a fire will progress. This last is really a codicil to the requirement for a combustible fuel, hereinabove set out. The distinction of the herein invention over U.S. Pat. No. 3,252, 770 of May 24, 1966 will be apparent later in this description.

The devices and methods of the prior art all provide the fuel, and the heat, but deny access of atmospheric oxygen to the fuel while it is being heated. Therefore the devices and methods of the prior art function capriciously. In general, the devices of the prior art are interfered with by stacking charcoal over them. By contrast the device of this invention, and the device of my 1966 invention are not interfered with by the charcoal. In fact the device of the present invention relies upon the charcoal presence and cooperates with charcoal in establishing a substantial combustion process quickly.

I now mention, obviously out of normal sequence, a diagram I have prepared to explain the principles spelled out in the above paragraph as they apply to my herein firestarter/firebuilder. The diagram shows the essential principle of the herein invention and adds a greater understanding of the term pyrogenerative, which will be dealt with shortly.

There are seen in the market from time to time variations of the pyrotechnic art already well represented in the older patents. All these are dangerous and work essentially like auxiliary fuels do, denying the fuel to be lit good access to atmospheric oxygen because of the large volume of gaseous products (carbon dioxide, water vapor, etc.) which these explosive devices produce. Very often, such pyrotechnic items plaster the fuel to be lit with alkali hydroxides or inert salts, which are, in their own way, fire extinguishing materials. All such undesirable effects are avoided by using the firestarter/firebuilder of this specification, which is absolutely safe, even in very large models. It is safe to use more such starters over and over in difficult ignition problems (such as wet brush). The re-use of volatile hydrocarbons is a frequent source of burn casualties. The device herein described cannot explode in any sort of use, and never causes burn casualties. Because the feedback loop of the diagram of figure five corresponds with temperatures in excess of 2500 degrees fahrenheit, users are well warned and have time to move their hands. Nobody gets burned, and the fuel is lit in a few seconds!

NEWLY DISCOVERED PROPERTIES OF OXIDIZING AGENTS

In the previously issued patent (on a firebuilder, not a firestarter), U.S. Pat. No. 3,515,525, Patented Jun. 2, 1970, I introduced a word "pyrogenerative". I did not succeed in convincing the examiner that the new word satisfactorily identified a property of matter. Since that time I have produced an exact definition of pyrogenerativeness, hereinafter called pyrogenicity, and devised means to measure that property quantitatively and reproducibly in oxidizing agents that exhibit it. Pyrogenicity so defined and so measured is a special type of rate constant for a category of chemical oxidizing processes.

The definitions are: "Pyrogenicity: A property of an oxidizing agent which measures the ability of the oxidizing agent to support and propagate the combustion of a fuel substance with which it is not in physical contact" and: "Pyrogenerative: The fire propagating quality of an oxidizing agent which exhibits a measurable pyrogenicity".

The statutes and regulations of CFR 37 and other sources do not support the idea that a newly discovered property of matter can be patented. However, there is support for the proposition that a new method of measuring any property of matter may be patentable, and that newly discovered apparatus to perform measurements may be patentable. Since the quantitative measurement of pyrogenicity may be patentable, and since that subject matter does not form a part of the present invention, the details of the measurement of pyrogenicity will have to be separately published, either by patenting, or perhaps through the media, if it is decided to dedicate these discoveries to public use. If required by the examiner, affidavits of results of pyrogenicity measurements will be furnished in support of this invention relating to a firestarting and firebuilding combination.

For convenience, a very abbreviated summary of approximate pyrogenicity of a number of oxidizing agents is offered now. Iron sesquioxide gives a zero value. Molybdenum trioxide gives a zero value. Potassium perchlorate gives a zero. Potassium ferricyanide gives a zero. Potassium chlorate mixed with manganese dioxide gives a value between one and ten for its pyrogenicity, the exact value depending on the percentage of manganese dioxide, and how thoroughly mixed. Manganese dioxide gives a low number, near one. Manganese dioxide is not a feature of the new discoveries of this specification, as will be evident shortly. Potassium permanganate is significantly pyrogenerative, but less so than the potassium chlorate mixture. Lead dioxide is pyrogenerative, but it should not be tested for the reason that the test is likely to cause release of toxic quantities of lead into the environment. Impure potassium perchlorate, in the form of a solid solution of potassium permanganate in the potassium perchlorate is pyrogenerative. The degree of pyrogenicity of this solid solution depends on the percent of the impurity, among other things.

CONFIRMING PYROGENERATIVENESS

If a quantity of oxidizing agent be mechanically supported under, but not in contact with a quantity of black carbonaceous fuel, and if it so be that from any point of observation on the top surface of the oxidizing agent the carbonaceous fuel occludes a solid angle of two pi steradians, and if, in these circumstances it so be that the feedback loop illustrated in figure five shows a regeneration factor of more than one for the oxygen in the loop, such an oxidizing agent is pyrogenerative.

ANOTHER NEW PROPERTY OF AN OXIDIZING AGENT

Since the identification and physico/chemical system of measurement of pyrogenicity, I have discovered another more or less related property of matter pertaining to oxidizing agents. I have called this property pyrovicity. Pyrovicity applies to a class of oxidizing agents which can cause the propagation of combustion over an interface between a fuel substance with which the oxidizing agent is in contact (but not intermingled with the oxidizing agent at the contact interface). Pyrovicity can most easily be quantitatively assessed by the adoption of a standard fuel substance with which the oxidizing agent is in contact. A carbon surface produced by charring wood has proved satisfactory for the reproducible measurement of pyrovicity. Like pyrogenicity, the property I call pyrovicity is measured in units which include time to the minus one power, and also, for the same reasons, it is something like a chemical rate constant. For exactly the same reasons as those given at the end of the discussion of pyrogenicity, further details of or pertaining specifically to the measurement of pyrovicity are not disclosed herein.

Since my previous work on the oxygen yielding devices for fire starting and firebuilding, I have discovered that a very wide support or container interferes with the flow of oxygen of the air to the ignited charcoal. In fact, devices generally like the illustration of FIG. 1A of my firebuilding U.S. Pat. No. 3,515,525 Jun. 2, 1970 did not allow the oxygen of the thinner air of Denver, Colo. sufficient access to the charcoal after the pyrogenerative process ceased. The firebuilder, which worked well at sea level air pressure, didn't work in the lower pressure of air in mountainous places. Since the time of that firebuilder I have discovered two ways to overcome the problem described above. One of these new discoveries is the choice of making the devices narrower, and arranging for the oxygen yielding substance to extend closer to the outer edges of the new devices. Another discovery comprises the deliberate provision of a specific channel for air flow directed at the charcoal briquets which have been ignited. Other discoveries have extended the list of oxidizers well suited to the construction of firestarter/firebuilder devices of the kind disclosed herein.

Many oxidizing agents exhibit pyrovicity. Some of the pyrovicive substances are not significantly pyrogenerative. On the other hand, the items which are pyrogenerative, as it now appears always exhibit a significantly measurable degree of pyrovicity.

AN OXIDIZING CATALYST/BINDER MATERIAL

I have discovered new and very practical substances to serve as oxygen sources in my firestarter invention, and these are now presented. Categorically substances that are really good are but rarely pure chemical individuals. A substance different from any disclosed in my expired patent U.S. Pat. No. 3,515,525, Jun. 2, 1970 comprises potassium chlorate ground together with manganous acid (a substance precipitated from a water solution of a soluble permanganate). The manganese compound, sometimes mistakenly labelled "chemically precipitated manganese dioxide" tastes sour, and is very different from the ground mineral pyrolusite, which has no appreciable water solubility and no taste at all. (Pyrolusite is essentially pure manganese dioxide) Fortunately, the manganous acid can catalyze the decomposition of the potassium chlorate at a temperature under 420 degrees fahrenheit. The manganous acid adds another useful property beyond what pyrolusite powder can do. It functions as a tabletting binder. The mixture that includes it can be tabletted leaving out the inert non oxygen yielding additives such as bentonite. Leaving out the chemically inert material is good. It makes better firestarters.

In the ingredients an oxidizer fulfilling the purposes of this invention as much as 15% manganous acid or as little as 3% in a satisfactory range of concentration. The formula of the sour tasting manganous acid is H MnO. There is significance in the choice of grinding the mixed potassium chlorate manganous acid composition rather than grinding the ingredients before mixing them. This topic is treated more in detail in a later paragraph.

Another chemical improvement in the oxygen yielding tablet of this invention is especially valuable for service in the most superior grade of the firestarter product, the model recommended if making a good fire with certainty under adverse conditions is a life or death necessity. Potassium perchlorate is not pyrogenerative because of its very high temperature of decomposition, and because of its poor ability to absorb radiant heat from oxygen assisted burning fuel in its vicinity. The potassium perchlorate is absolutely resistant to high humidity, and has more oxygen available per unit volume than does the potassium chlorate. The perchlorate also responds not at all to the manganous acid catalyst. However, an equal mixture of the potassium perchlorate with potassium chlorate can be ground together, or otherwise mechanically processed, (with manganous acid added) to produce a very good pyrogenerative tablet. Up to 15 percent of the manganous acid may be added in a preferred composition which yields a lot of oxygen at a suitable temperature for good firestarter/firebuilder performance. Among other things, such a tablet has superior water resistance and very good long storage life.

Another way to make use of the good qualities of potassium perchlorate can be done by adding a few percent of saturated water solution of potassium permanganate to a hot water (at least 180 degrees F.) water solution saturated with potassium perchlorate. On rapid cooling, crystals quickly form from the mixed solution. The crystals are purple, and are in fact a solid solution of the chemically less stable potassium permanganate in the very stable potassium perchlorate. The purple crystals are still very humidity resistant, but yield oxygen very much more easily when heated. Unlike the pure white crystals of pure potassium perchlorate itself, the purple crystals are pyrogenerative, and serve well to start or to build a fire with charcoal briquets. No catalyst is needed and none are effective. The purple crystals do require a tabletting additive. Manganous acid is very suitable and, of course, adds a little oxygen. A purple crystal solid solution material with about 6% potassium permanganate in it works very well.

In the sense that all the atoms of a mixed crystal are joined together by ionic chemical bonds, the mixed crystal is a big molecule. It is. in fact a chemical compound with variable composition. Every chemical compound is a new chemical individual, not required to exhibit properties which represent any sort of average of the properties of its elementary constituents. These statements apply to the mixed crystals, and to the solids described in the next paragraph.

SOLID SOLUTIONS OF A NEW SORT (HAVING INTERNAL CHEMICAL ENERGY)

In making gunpowder, the late Mr. E. I. DuPont discovered the advantage of grinding together the ingredients of it. Previous workers had obtained indifferent results by first grinding the ingredients separately, and mixing after all the grinding was finished. A paper published by A.M. Gaudin in volume LXXIII (73) of the transactions of the American Institute of Mining and Metallurgical Engineers, entitled "An Investigation of Crushing Phenomena" extends from page 253 to 316 of that volume. In his very complete discussion of the crushing and grinding of brittle substances, Gaudin gives some clues as to what it was that Mr. DuPont accomplished. According to Gaudin, brittle substances yield particles of as few as one to three molecules in an extended grinding process. In the gunpowder meal, as DuPont called his grinding product, he had something very like a high explosive. Meal made by first grinding and then mixing is nothing like the product DuPont made. DuPont suppressed the high explosive quality of his gunpowder meal by consolidating it with enough pressure to drive nearly all the air out. The solid so produced was then granulated to desired particle sizes, rather coarse. The coarser granules made slow burning gunpowder, the finer ones made faster burning gunpowder.

An operator can make a DuPont type of solid, regrind the condensed solid to very fine powder, and consolidate it again if he wishes. A sufficiently thorough grinding reduces the ultimate particles of every chemical form to a size comprising a few atoms only. A thorough enough application of such procedures leads to a solid solution of a sort that cannot be formed from the ingredients by solution or precipitation. Indeed, such a solid solution has internal energy by reason that the substances are put together at the cost of energy, and should be considered to be out of thermodynamic equilibrium. It was such a solid solution of potassium nitrate, sulfur, and charcoal that made DuPont's gunpowder better than powders which were merely ordinary mixtures.

I have already presented the solid solution of potassium perchlorate and potassium permanganate, which differs substantially from either of its ingredients and any ordinary mixture of them. (A thing not mentioned before is the fact that potassium permanganate alone does not function well as a pyrogenerative substance.)

The discovery of a class of solid solutions of materials out of thermodynamic equilibrium leads to new and useful results in the manufacture of tablets for my firestarter/firebuilder. For convenience I call these special solid solutions DuPont solids, since Mr. DuPont apparently perfected them from the earlier French concept of "pulverein" in the gunpowder business. A DuPont solid made from potassium perchlorate and barium chromate can be expected to serve as a pyrogenerative material. As little as five percent of the barium chromate imparts very different properties in a DuPont solid. The decomposition temperature is very much lowered from the 600 degree (fahrenheit) stability of the perchlorate alone.

If a crystalline solid solution of a very small percentage of barium ferrate is made with barium chromate, and the resulting crystals are used as a minor constituent of a DuPont solid composed chiefly of potassium perchlorate, a lower temperature of decomposition is achieved. (lower than the decomposition temperature would be without the ferrate)

In general, DuPont solids, and all such solids as are made up with a minor ingredient easily decomposed at a low temperature are pyrogenerative, and do not require the presence of any added catalyst.

A DuPont solid, or an ordinary solid solution may be chosen to produce a pasty material when heated to release its oxygen. The pasty or gelatinous material does not run down in use in the firestarter. Tablets that extend to the very edge of the support become feasible. As pointed out elsewhere in this specification, narrow is better.

I have discovered that charcoal or other carbonaceous fuel (such as wood or peat, or coal) tends to remain on fire very persistently when there is a presence of oxidation activating catalyst material in the fuel. Such catalysts include but are not limited to copper, silver, gold, the platinum group, tungsten, molybdenum, chromium and manganese. I have found that as little as two hundredths of a percent of copper prevents coals from going out when present in a carbonaceous fuel. It does this by lowering the temperature threshold for the reaction of oxygen with the carbon of the charcoal briquet.

A firestarter/firebuilder tablet containing one percent copper oxide evaporates some copper in use, and makes the coals of the briquets which have been lit more persistent. The small amount of the copper so evaporated contaminates the briquets nearest the tablet, permitting the catalytic enhancement of the oxidizing power of the air to continue after the oxygen yielding effect of the tablet has come to an end. Tungsten trioxide chromium sesquioxide, and molybdenum trioxide may also be added in the tablet. (manganese is usually present to serve as a tabletting additive) To make the temperature of the tablet higher, some 200 mesh atomized aluminum may be added. As little as one percent of the aluminum greatly increases the amount of copper that is distilled. Coarse powder of titanium, zirconium, or sparking metal may also be used. (Sparking metal, used in cigarette lighters, is a cerium alloy.)

BRIEF DESCRIPTION OF DRAWINGS

FIG. 1 presents a view of the fire resistant cavity of the firestarter/firebuilder adapted to contain a powdered oxygen yielding substance, and shows the placement of the fuse.

FIG. 2 shows the external appearance of the same model of the firestarter/firebuilder to which figure one pertains, but with the cardboard top cemented in place.

FIG. 3 shows external appearance of a cardboard covered oxygen yielding firestarter/firebuilder modified to permit a central flow of air to sustain the fire after it has been started.

FIG. 4 shows a fire resistant inner structure, with fuse provided for a firestarter/firebuilder based on oxygen yielding tablets, and shows the placement of the fuse.

FIG. 4A shows the appearance of a tablet based firestarter/firebuilder after its inner structure has been covered with a protective wrapper, allowing only the fuse to be exposed.

FIG. 5 is a diagram showing the working of a positive feedback energy flow loop, intrinsic in the firebuilding phase of the operation of the firestarter/firebuilder, carrying energy in a closed loop.

FIG. 6 shows a mechanical structure adapted to support compositions of matter useful in the string-pull ignition system for an oxygen yielding firestarter/firebuilder.

FIG. 6A shows a mechanical structure for a string-pull igniting device, like that of FIG. 6, with the string, mechanical support, and the compositions of matter added to make it complete.

FIG. 6B shows how the mechanical structure of the string-pull fuse assembly is modified to firmly retain the compositions of matter which are added to make it complete.

SUMMARY OF THE PRESENT INVENTION

A fire starter of the present invention comprises an oxidizing agent which exhibits significant measures of pyrogenicity and pyrovicity supported in a container with a paper top. The inside of the support is a fuel substance. The structure is provided with a fuse that can be lit by igniting an end or edge of the paper top. The fuse intervenes between the paper top and the container block, extending on the inner surface of the cavity therein far enough to reach the first portion of the contained oxidizing agent where it rests on the container cavity surface. The cover is no hindrance to the use of the firestarter, being quickly destroyed after the fuse is lit.

For a starter in which the pyrogenerative oxidizing agent is consolidated in the form of a plurality of tablets, the tablets may be fitted into recesses provided for them in a member which is part of the mechanical support for the tablets. The fragile (thinner) top cover is provided as the upper part of a wrapper which surrounds the supporting structure completely. In this form, the fuse is secured within the end of the wrapper, where it can be ignited by igniting the wrapper.

In operation, the combustion of the surface of the container in contact with or very close to the oxidizing material is initiated by the fuse, generating hot gaseous products of combustion. These hot gases heat the adjoining mass of the contained oxidizing agent to a temperature high enough to chemically decompose it, releasing gaseous oxygen. The hot oxygen (diluted by the gaseous products from the combustion of the inside of the container) quickly burns up the fragile cover, (or upper portion of the wrapper). With the cover burned up, the hot mixture of gases containing oxygen immediately ignites the charcoal which the operator has provided. Radiant heat from the ignited charcoal, striking the now open top of the container, heats and decomposes the top surface of the contained oxidizing agent causing the emission of pure oxygen, building the fire thereby. By this pyrogenerative action successive deeper layers of the oxidizing agent are decomposed, until it has been entirely used up. At this point in time, the action of the firestarter ends, and the combustion of the charcoal is thereafter supported by oxygen of the air.

In the operation of the firestarter of this invention there is present during the ignition of the charcoal by the firestarter a more or less directed flow of pure hot oxygen impinging upwardly on the charcoal. The directing of the flow of oxygen is brought about by the very low density of the intensely heated oxygen.

The central concentration of the hot oxygen flow, so provided, causes a stronger ignition effect near the center of the starter. A compact nest of coals in the charcoal results. Experience shows that creating such a nest of coals is the most satisfactory way to start a charcoal fire.

SCHEDULE OF OPERATION OF THE FIRESTARTER/FIREBUILDER

The firestarter of the present invention operates in a plurality of successive stages to light and build a charcoal fire effectively and rapidly. These are:

1) The interval of functioning of the fuse. A fuse generally similar to fuses employed in pyrotechnic or military devices carries a combustion process from a point on the outside of the firestarter to an area inside the container of the oxidizing substance, there initiating an oxidation process along the region of contact between the oxygen yielding (pyrovicive) substance and the inside wall of the container. This process occupies about two seconds.

2) The reaction of the inner wall of the container (or support) produces very hot gaseous products. These decompose a small portion of the oxygen yielding substance. The hot gasses mixed with heated oxygen destroy an overlying area of the paper top of the oxygen yielding container. The surplus oxygen, being hot, ignites charcoal upon which it flows. This process may require five seconds. This is the firestarting activity of my herein described device.

3) The incandescent charcoal existing at the end of process 2 destroys a large area of the adjacent paper cover or top portion of the wrapper above mentioned, and, by radiant heat, decomposes the top layer of the oxygen yielding substance exposed to the heat. The added oxygen released by this pyrolysis increases the intensity of the combustion of the charcoal and ignites more of the adjacent charcoal. The increases combustion of the charcoal further accelerates the rate of production of the pure oxygen by the pyrolysis of more of the oxygen yielding material contained in the firestarter. This cumulative process is far more rapid than the action of the oxidizer on its combustible container. Therefore this process goes to completion long before the base of the container is totally destroyed. About thirty five seconds pass before all the available oxygen has been evolved. The described events represent the fire building activity of the device herein specified. To assist understanding of the principles of this firebuilding process refer to figure five.

4) The stimulation of the charcoal fire by oxygen from the starter device ceases, and oxygen of the air supports the combustion of the charcoal for as long as the air passages of the charcoal cooker are kept clear and charcoal is added by the operator to replace the fuel that has been consumed.

CHEMICAL COMPOSITION OF COMPONENTS OF THE HEREIN FIRESTARTER/FIREBUILDER

I proceed now to more specifically illustrate the chemical options and limitations which relate to the firestarter of this invention. Newly made discoveries have extended the options of chemical choice vastly, affording significantly wider options in the performance of the starter. The fuse may be made by painting in place a thin paste of finely ground oxidizer contents mixture and bartop lacquer. In making the oxidizer contents, the choice of proportions in the blend of potassium chlorate and manganous acid has usually been chosen in the range of ninety plus percent potassium chlorate and the difference from one hundred percent in the form of manganous acid which serves as a tabletting binder and as a catalyst to lower the temperature of release of gaseous oxygen from the potassium chlorate. In the firestarter of this invention a much larger amount of manganous acid is tolerated, up to 80 percent. Potassium permanganate is also tolerated, in any amount, up to 50 percent In tabletted material, many of the DuPont solids, and several ordinary solid solution crystalline materials may be used, particularly those in which potassium perchlorate is the principal ingredient. The operator may guide his choice of such materials in accord with the newly discovered chemical information appearing in an earlier part of this specification.

Mixtures that contain oxidation catalysts, illustrated by copper, are favored. If it is necessary to raise the temperature of the tablets when they are operating, combustible metal particles are favored, illustrated by paint grade aluminum powder, titanium or zirconium powder, or by powder of cerium sparking alloys. Holding these below two percent, the operator avoids dealing with explosive mixtures.

SPECIAL ADVANTAGES OF FIRESTARTERS OF THIS INVENTION

I now summarize the special superior features of this firestarter invention. Advantages which I provide are:

1) The firestarter of this invention can light wet brush when other starters cannot.

2) The firestarter of this invention can be used several at a time, or several in sequence without any explosion danger which would be present in any similar use of hydrocarbon lighter fluid.

3) A firestarting process which does not flavor the food with vapors similar to kerosene.

4) A charcoal firestarter which reacts chemically with the charcoal, even though it is not in contact with the charcoal.

5) A charcoal firestarter which does not produce flames extending more than three inches above the charcoal.

6) A charcoal firestarter which is environmentally clean in its recommended use.

7) A firestarter in which none of the ingredients composing it are seriously poison in the storage and use of the starter. The potassium chlorate is, in fact, an antidote for cyanide poisoning!

8) A charcoal firestarter which can ignite more than five charcoal briquets in less than a minute.

9) A charcoal firestarter which cannot explode under any circumstances, including the accidental burning of large numbers of them contained in storage conditions.

10) A charcoal firestarter which can be subjected to exact quality control in respect to its performance in starting charcoal fires.

11) A charcoal firestarter which never fails to work safely.

12) A general purpose firestarter with qualities as set out above.

13) A charcoal firestarter which (by their own combustion in nearly pure oxygen) heats the surfaces of charcoal briquets to a temperature in the vicinity of 2500 degrees celsius over a period of time sufficient to permit substantial amounts of heat to be conducted into deep lying portions below the surfaces of the briquets, the period of time being greater than five seconds and less than forty seconds.

14) A charcoal firestarter which heats charcoal briquets (by their own combustion in nearly pure oxygen) long enough to cause a substantial portion of the mass of each briquet so heated to reach a temperature considerably higher than the kindling temperature of the charcoal in air.

15) A charcoal firestarter which programs the firestart revealing distinct phases of its performance. By this the operator can, by his own observation, always be sure that he has a perfectly made starter.

16) A firestarter in which the principal chemical ingredients are non-explosive, non deflagrating, and incombustible.

17) An oxygen yielding firestarter/firebuilder combination in which the amount of nearly pure gaseous oxygen produced by the device is adequate to generate coals of fire on several charcoal briquets the amount of nearly pure gaseous oxygen being at least one hundred times the volume occupied by the firestarter/firebuilder determined by measuring its outer dimensions.

18) A firestarter which cannot detonate under any conditions.

19) A firestarter adapted to deliver to the surface of the fuel being lit an oxidation catalyst that makes the fuel, once it is lit, burn more persistently.

20) A firestarter which can function effectively in the thin air of a high mountain environment.

21) A firestarter which remains operational for at least twenty years in humid climates.

Preferred Oxidizing Agents and Mixtures
Composition of Firestarter/Firebuilder Structure I proceed now to more specifically illustrate the chemical options and limitations which relate to the firestarter of this invention. Newly made discoveries have extended the options of chemical choice vastly, affording significantly wider options in the performance of the starter. The choice of proportions in the blend of potassium chlorate and manganese dioxide, as disclosed in the firebuilder patent of Jun. 2, 1970 (U.S. Pat. No. 3,515,525) was taken (in the practice of that invention) in the range of ninety or more percent potassium chlorate and the difference from 100 percent was taken up by manganese dioxide and a tabletting additive (binder). In the firestarter of this invention a much larger amount of tetravalent manganese material (manganous acid) is tolerated, up to 80 percent, and no inert binder is required. Potassium permanganate is also tolerated, in any amount, up to 75 percent. Potassium manganate works, in any range of concentration. Sodium chlorate can be substituted for a part of the potassium chlorate. The resulting tablets are stable under nearly all ambient conditions, excluding the constantly wet places like Florida, the Gulf Coast, and the Seattle area. Performance of fuel containers to hold the oxidizing material can be improved by coating the inside surface of such containers with nitrocellulose base bartop lacquers. It appears that any grade of the bartop lacquer will work. With a thick bartop lacquer coating, metallic (but not highly reactive metals such as aluminum, magnesium or titanium) or ceramic containers (including glass) are acceptable.

String Pull Ignition of a Firestarter/firebuilder

If an explorer, naturalist, or hunter were in an inhospitable wilderness area and needed a fire for the sterilization of water, and had one of my firestarters and three matches, he could still be in trouble. If the wind, blew out the matches, the firestarter/firebuilder would do him no good.

To address the problem stated above, I show now a means of igniting the firestarter/firebuilder with a high degree of certainty. Once the firestarter/firebuilder has been ignited, the wind cannot blow it out. Under any shelter at all, and with a little kindling collected, there will be a means to boil the water in a very few minutes.

DESCRIPTION OF STRING PULL IGNITION SYSTEM AS SHOWN IN THE DRAWINGS

FIG. 6 shows a little structure that can be made of wood, plastic or sheet metal. The structure, 1, is a modified I beam. In FIG. 6A I show how the coating of the structure 1 fills two spaces, 2, and 3, of the structure, 1. The FIG. 6A also shows how the filling effectively fastens the structure, 1, to a section of the fuse, 4, extending from the front of a firestarter/firebuilder such as the one illustrated in FIG. 4. A hole, 5, is provided in the filling of the section of the structure, 1, which does not contain the fuse. A string, 6, extends through the hole, 5, fitting snugly. A portion, 6A, of the string, 6, has on it a coating of a different nature from the material which fills the spaces in the structure 1. The partition, 7, is provided with holes, 8, as shown in the side view, FIG. 6B. A portion, 32, of the string, 6, is accessible to be pulled, extending beyond the end of the wrapper at the fuse equipped right end of the firestarter/firebuilder shown in FIG. 4A as it appears when enclosed by wrapper 31.

The composition of the outer part of the structure, 1, as shown in 6B, is safety match-head material. The material adhering to the string at 7 is the same as the material used in the striking strip of the common book matches. When the string is pulled, these two materials are rubbed together and the match-head material is ignited, igniting the fuse immediately.

An operator can hold the firestarter/firebuilder at the end opposite to the string when he pulls the string. He has several seconds to lay the starter down safely and cover it with kindling.

General Chemical and Structural Description of Non-Tablet Firestarter/firebuilder Containers for the unconsolidated oxidizing materials can be made of particle board, or any drop off material from a lumber mill or carpentry shop. Satisfactory dimensions are (outside) four and one quarter inches long, three quarters of an inch high and one and one eighth inches wide. The containing space, cut from the top down is 7/8 inches wide, and 5/8 inches deep at the center. The bottom of the cavity is a cylindrical surface, the cutters that produced the cavity being a stack of six inch diameter saw blades. Twenty five grams of oxidizing agent, more or less, is contained in the filled cavity. The amount of element oxygen which should impinge on the charcoal to give a good ignition is in the vicinity of five grams. The top closure, for powdered oxidizing agents, is a piece of cardboard one thirty second of an inch thick, more or less. Firestarters can be made much larger or smaller, the dimensions given are for illustrative purposes only. A firestarter capable of delivering several pounds of element oxygen has been tested and found capable of igniting an enormous bonfire in a matter of three minutes, more or less. All the oxygen yielding firestarter models which have been made and tested have shown hundred percent efficiency. One starter produces one light. In a very large number of show and tell experiences, there have been no surprises no hair, eyes, skin, or fingers burnt, and never any explosions. The reduction products left after the starters have served are harmless compounds of manganese and potassium which can be disposed of to the environment.

DESCRIPTION OF TWO FORMS OF THE NON TABLET EMBODIMENT AS SHOWN IN THE DRAWINGS

In FIG. 1 there is shown a block 9, with a cavity, 10, in it, a cavity suitable to contain an oxygen yielding substance of the kind required to serve the purposes of the herein invention. Deposited in the vicinity, 11, at the front of the top of the block 9, in a very shallow groove as illustrated, there is present a small quantity of fuse material, a solid substance adherent to the block. As illustrated, the fuse material 11, extends a small distance as a coating on the lower surface of the front part of the cavity 10.

FIG. 2 illustrates the same block, 9, as it appears after the ingredients are in place in the cavity and the card, 12, is placed on the top, glued in place by a suitable adhesive. Under the card, in the vicinity 11A, the fuse material, 11, (hidden from view by the card, in figure two) is in contact with additional fuse material adherent to the underside of the front portion of the card. When the user applies a match flame underneath the front portion of the card 12, the aforesaid fuse material (11, of FIG. 1) is ignited, carries its ignition to the fuse material in the groove under the card 12, in the vicinity 11, and the burning of the fuse, extending into the cavity (10, of FIG. 1) initiates combustion (pyrovicive) of the block surface, the combustion being supported by oxygen available from the oxygen yielding material filling the cavity (10, of FIG. 1).

FIG. 3 illustrates an arrangement in which two of the block starters of Figures one and two are combined to achieve a superior performance of the oxygen yielding system in the thin air of high mountain territories. Two block starters 13 and 14, are assembled in a manner such that they can be simultaneously ignited when a match is applied in the vicinity 15 of the front of the card of which the rear portions are at 16 and 17. The fuse material on the underside of the card 15 extends to the localities indicated 18 and 19, localities where there are fuse-filled grooves in the top of the block 20. Fuse material extends away from the viewer on the bottom surfaces of each of the two cavities containing the oxygen yielding material. At the rear of this starter, a wooden pin 21 is secured to strengthen the structure of this starter arrangement. In use, the two starters act side by side to ignite and build a fire involving charcoal immediately above the space 14. After the oxygen release of this starter assembly comes to an end, air flows directly and unhindered upward through the space 15 to sustain the combustion of the briquets which have been lit.

It is this direct and unhindered flow of the air which makes this assembly work better in the thin, oxygen starved mountain atmospheres.

The structure of the blocks illustrated may be made of wood, of particle board, of combustible plastics, or of fire resistant materials if the front portion of the inside of the cavity is coated with some combustible substance.

DESCRIPTION OF A TABLET CARRYING MODEL OF FIRESTARTER/FIREBUILDER AS SHOWN IN DRAWINGS

In figure four I illustrate one model of a tablet carrying firestarter/firebuilder. An extending portion, 21, of the cardboard base, 22, is folded over above the base, extending to the right. The right portion is locked in place by a slot in a short upwardly folded section of the base, 23. A forwardly (to the right) extending portion, 24, of the upper member, 21, has a small hole in it, 25, through which passes a fuse, 26. The fuse continues through a small hole, 27, in the short upwardly folded portion, 23, of the card, 22. The leftward extending portion, 28, of the fuse passes under the first tablet, 29, under which it is coiled in a small loop (hidden from our view by the tablet, 29. Other tablets, such as is shown at 30, fill circular holes in the right extending folded portion, 21, of the base card, 22. The tablets, illustrated at 29 and 30, are all alike, and have been made of any chosen composition of matter described in the foregoing chemical descriptions of this specification. A paper wrapper, 31, illustrated in FIG. 4A, surrounds the entire cardboard tablet and fuse bearing structure, including the rightward extending portion, 26, of the fuse. The wrapper, 31, serves to mechanically secure the tablets from falling out of the holes in which they are placed, and carries printed instructions for the proper use of the firestarter/firebuilder. The extending string, 32, pertains to the string pull igniting arrangement, described earlier.

I claim:

1. An oxygen yielding firestarter/firebuilder in which the oxygen yielding material is a composition comprising not less than 85% nor more than 97% potassium chlorate, and not less than 3% nor more than 15% of manganous acid.

2. An oxygen yielding firestarter/firebuilder having a composition with not more than 2% of any metal of the class including aluminum, titanium, zirconium and cerium, having added thereto 1% of copper oxide, and in which there is present in the composition 1% of molybdenum trioxide, 1% of tungsten trioxide, and at least 1% of a manganese bearing chemical compound.

* * * * *